United States Patent [19]
Ng

[11] Patent Number: 5,450,759
[45] Date of Patent: Sep. 19, 1995

[54] AIRFLOW INDICATOR

[76] Inventor: Tony T. Ng, Cheung Wei Industrial Bldg., 2-4/F., 42 Lee Chung Street, Hong Kong, Hong Kong

[21] Appl. No.: 285,484

[22] Filed: Aug. 3, 1994

[30] Foreign Application Priority Data

Mar. 16, 1994 [GB] United Kingdom ............... 9405155

[51] Int. Cl.⁶ .............................................. G01F 1/22
[52] U.S. Cl. ................................................ 73/861.55
[58] Field of Search ...................... 73/861.551, 861.56, 73/861.57

[56] References Cited

U.S. PATENT DOCUMENTS

| | | |
|---|---|---|
| 2,749,742 | 6/1956 | Aller . |
| 3,181,358 | 5/1965 | Busillo .............................. 73/861.55 |
| 3,289,464 | 12/1966 | Byrkett et al. ................ 73/861.55 X |
| 3,974,857 | 8/1976 | Hehl ............................... 73/861.55 |
| 4,050,305 | 9/1977 | Evans et al. ..................... 73/861.55 |
| 4,174,733 | 11/1979 | Eidsmore et al. ............. 73/861.55 X |
| 4,302,980 | 12/1981 | Braatz ............................. 73/861.55 |
| 4,896,534 | 1/1990 | Daly .............................. 73/861.55 X |

FOREIGN PATENT DOCUMENTS

| | | |
|---|---|---|
| 347467 | 4/1931 | United Kingdom . |
| 600402 | 4/1948 | United Kingdom . |
| 1180720 | 2/1970 | United Kingdom . |
| 1359457 | 7/1974 | United Kingdom . |

Primary Examiner—Hezron E. Williams
Assistant Examiner—Elizabeth L. Dougherty
Attorney, Agent, or Firm—Merchant, Gould, Smith, Edell, Welter & Schmidt

[57] ABSTRACT

An airflow (1) having at least one air inlet (8) connectable to a pressurized air supply source; a plurality of air outlets (16) each connectable to a respective air tube; and a viewable chamber (28) pneumatically connected between the or each air inlet and each air outlet, each such viewable chamber (28) containing an indicating element (18) floatable within the chamber in response to flow of air from the air inlet to the air outlet to thereby visually indicate the flow of air through each respective chamber.

9 Claims, 5 Drawing Sheets

AIRFLOW INDICATOR

The present invention relates to an airflow indicator and, in particular, to an airflow indicator adapted to visually indicate the rate of flow of air therethrough.

There are known airflow indicators capable of visually indicating the rate of flow of air therethrough, such as by LED display. Such airflow indicators adopt electronic circuits and are therefore relatively expensive to manufacture and maintain. Such airflow indicators are usually powered by A.C. source which renders them potentially hazardous to be used in the proximity of an electrically-conductive environment, e.g. water. It is therefore an object of the present invention to provide an airflow indicator wherein the aforesaid shortcomings are obviated.

According to the present invention, there is provided an airflow indicator comprising at least one air inlet connectable to a pressurized air supply source; a plurality of air outlets each connectable to a respective air tube; and airflow indicating means pneumatically connected between the or each air inlet and each air outlet, each such indicating means comprising a viewable chamber containing an indicating element floatable within the chamber in response to flow of air from the air inlet to the air outlet to thereby visually indicate the flow of air through each respective chamber.

The rate of flow of air through each flotation chamber may be independently adjusted by valve means. To enhance visual comparison of the rate of flow of air through each respective flotation chamber, flotation chambers may be arranged side by side each other. The floatable indicating element may be a plastic bead.

An air distribution chamber, which communicates pneumatically with each airflow indicating means via adjustable valve means, may be disposed between the air inlet and the airflow indicating means.

The airflow indicator may be engageable with the rim of an open-top container, e.g. an aquarium, by engaging means. Such engaging means may comprise a pair of engaging elements each having a respective engaging surface opposite to the other. The engaging elements may be disposed respectively adjacent the upper portion and the lower portion of the airflow indicator and the horizontal distance between the engaging surfaces equals at least the thickness of the wall of the open-top container.

The airflow indicator may further include a swivellable portion movable between a first position in which the air outlets are exposed to the outside and a second position in which the air outlets are not exposed to the outside. The airflow indicator may also include means for guiding the air tube connected with each respective air outlet to turn through an angle of substantially 180° before leaving the airflow indicator.

The invention will now be described in more detail, by way of an example only, with reference to the accompanying drawings wherein.

Figure 1:
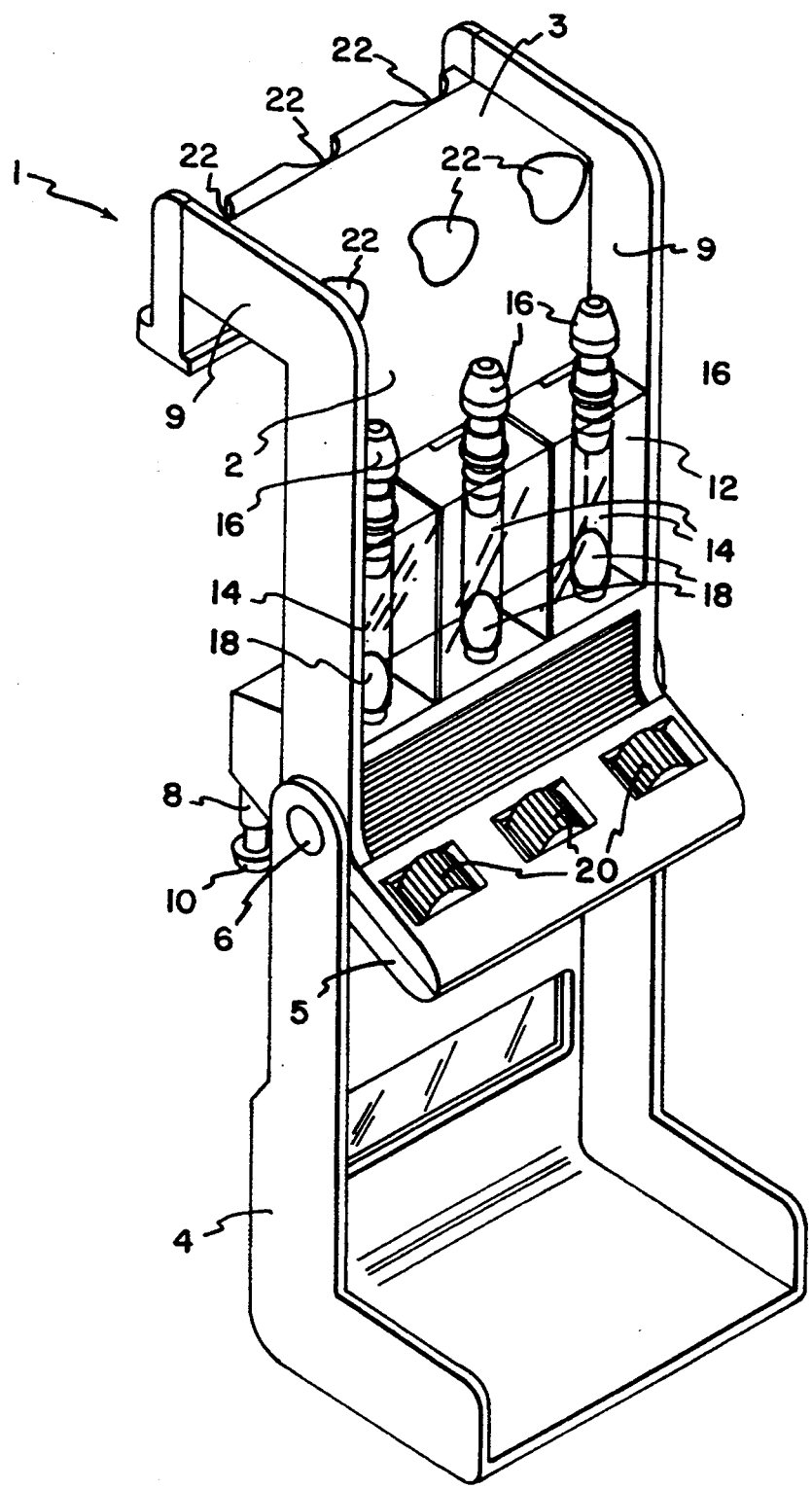
FIG. 1 is a perspective view of an airflow indicator according to the present invention wherein the swivellable portion is in the first position.

Referring to FIG. 1, there is shown generally an airflow indicator 1 having a body portion 2 comprising a shoulder 3 and a lower arm 5. The body portion 2 is generally confined by a pair of parallel rims 9. A generally L-shaped cover 4 is swivellable about a hinge portion 6.

The airflow indicator 1 my be connected to a pressurized air supply source, e.g. an air pump (not shown), via an air inlet nozzle 8, which is closable by a correspondingly sized and shaped closure pin 10. The airflow indicator 1 includes, as shown, three transparent housings 12 each having a respective cylindrical air passage 14 leading to a respective air outlet nozzle 16. The transparent housings 12 are arranged side by side so that visual comparison of the rate of flow of air through each respective air passage 14 therein is enhanced. The air outlet nozzles 16 are so shaped and sized for ready connection to a respective air tube (not shown). There is a plastic bead 18 floatable within each air passage 14 in response to the flow of air through the respective air passage 14. The extent to which each plastic bead 18 floats above the bottom of the respective air passage 14 within the transparent housing 12 depends on the rate of flow of air through the particular air passage 14.

Provided on the lower arm 5 of the airflow indicator 1 are adjustment knobs 20 which may be manually operated to independently adjust the rate of flow of air through each respective air passage 14 in a manner to be described below. Three pairs of recesses 22 are provided on the shoulder 3 to help guide the air tubes (not shown) when connected to the air outlet nozzles 16.

Figure 2:
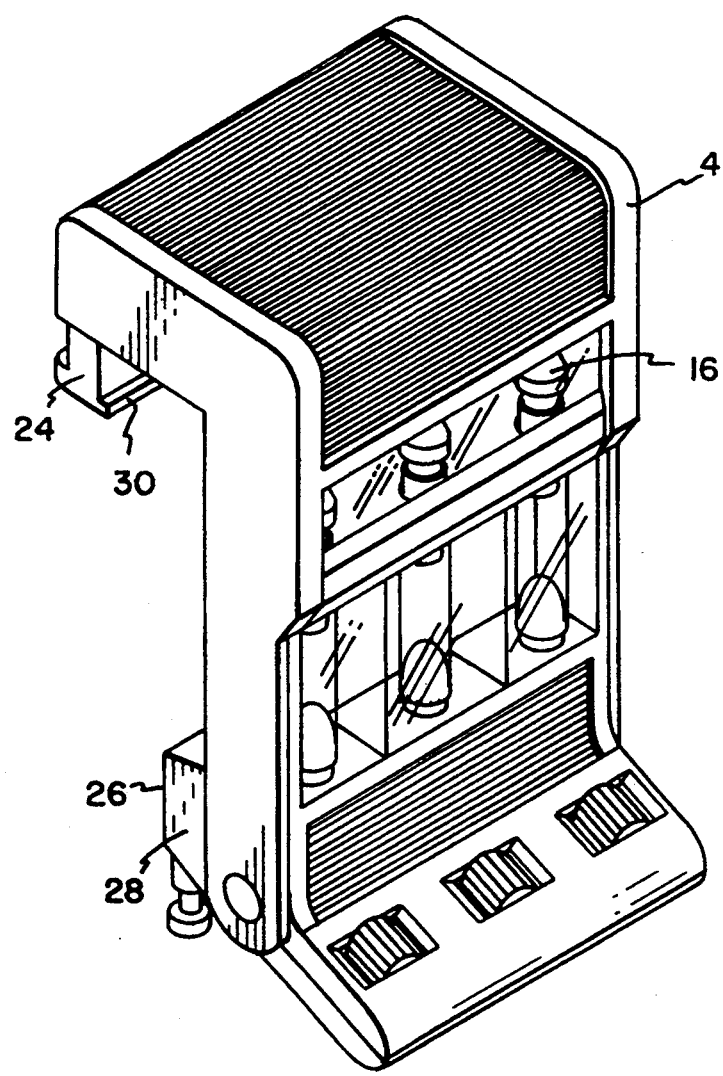
FIG. 2 is a perspective view of the airflow indicator wherein the swivellable portion is in the second position.

FIG. 2 shows the airflow indicator 1 when the swivellable cover 4 is closed against the body portion 2. It could be seen that by way of such an arrangement, the connections between the air tubes and the air outlet nozzles 16 are not exposed to the outside environment and thus accidental detachment between the air tubes and the respective air outlet nozzle 16 is to a large extent avoided.

The airflow indicator 1 is also apt to be engaged with the rim of an open-top container (not shown), such as an aquarium, by means of an engaging surface 30 of an upper arm 24 and an opposite engaging surface 26 of an air chamber 28. The horizontal distance between the engaging surface 26 of the air cheer 28 and the engaging surface 30 of the upper arm 24 at least equals the thickness of the wall of the open-top container such that the airflow indicator 1 could be mounted over the rim of the open-top container.

Figure 3:
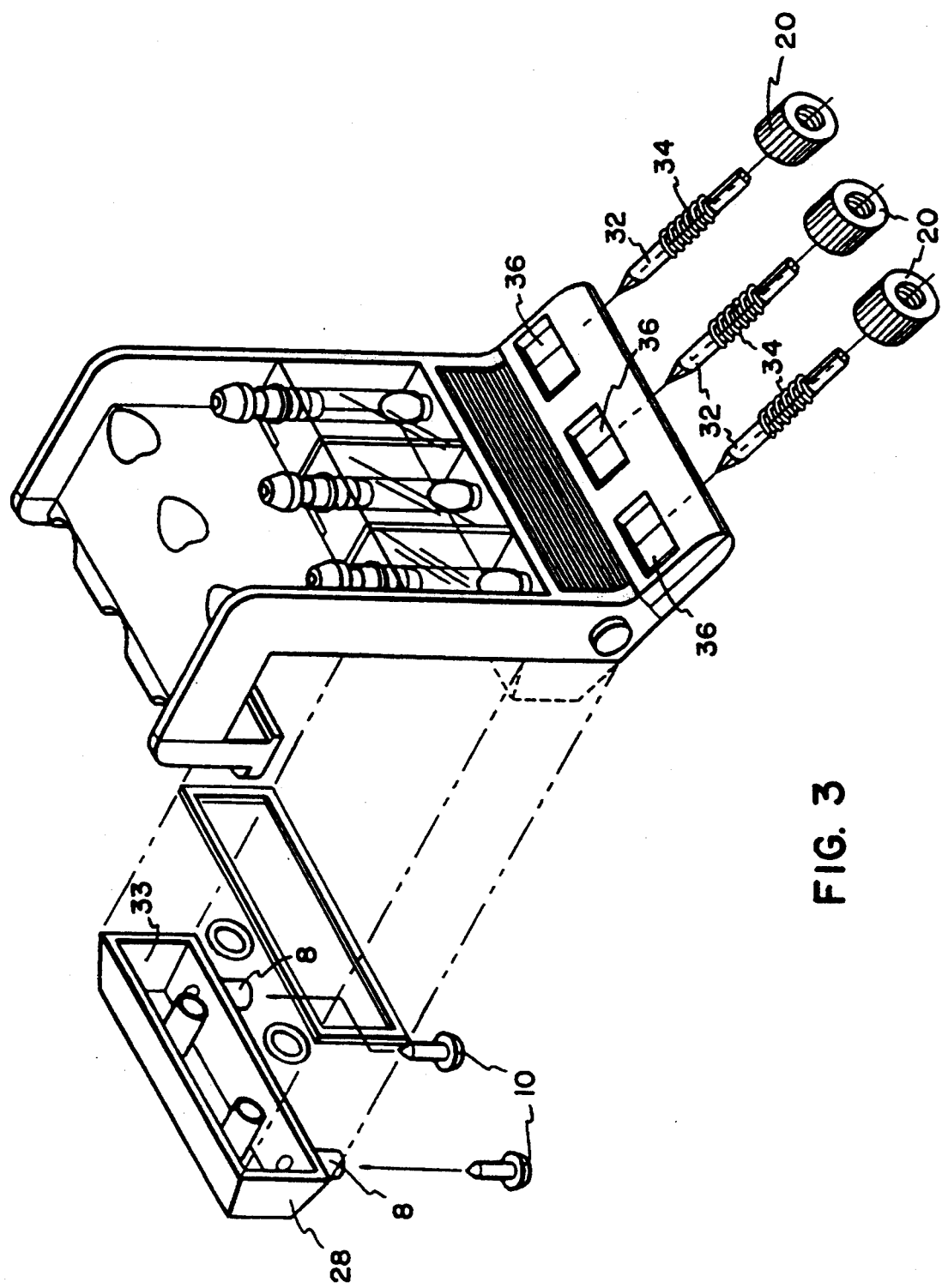
FIG. 3 is a partial exploded view of the airflow indicator wherein the swivellable portion is removed.

FIG. 3 is a partially exploded view showing the air chamber 28, the adjustment knobs 20 and accompanying valve spindles 32. The internal cavity 33 of the air chamber 28 communicates pneumatically with the air passages 14 and the rate of flow of air through each air passage 14 is adjustable by rotation of the adjustment knobs 20.

As can be seen from FIG. 3, the adjustment knobs 20 are in the form of cylindrical nuts threadedly engaged with the respective external threaded portion 34 of the valve spindle 32. The size of the adjustment knobs 20 is such that while the adjustment knobs 20 are free to rotate about their respective longitudinal axis within the respective cavity 36, lateral movement of the adjustment knobs 20 along the respective longitudinal axis is prohibited. By way of the mesh between the internal threaded portion of the adjustment knobs 20 and the external threaded portion 34 of the valve spindles 32, rotation of the adjustment knobs 20 within the respective cavity 36 will cause the respective valve spindle 32 to move forward or backward along its respective longitudinal axis, depending on the direction of rotation of the respective adjustment knobs.

Figure 4A:
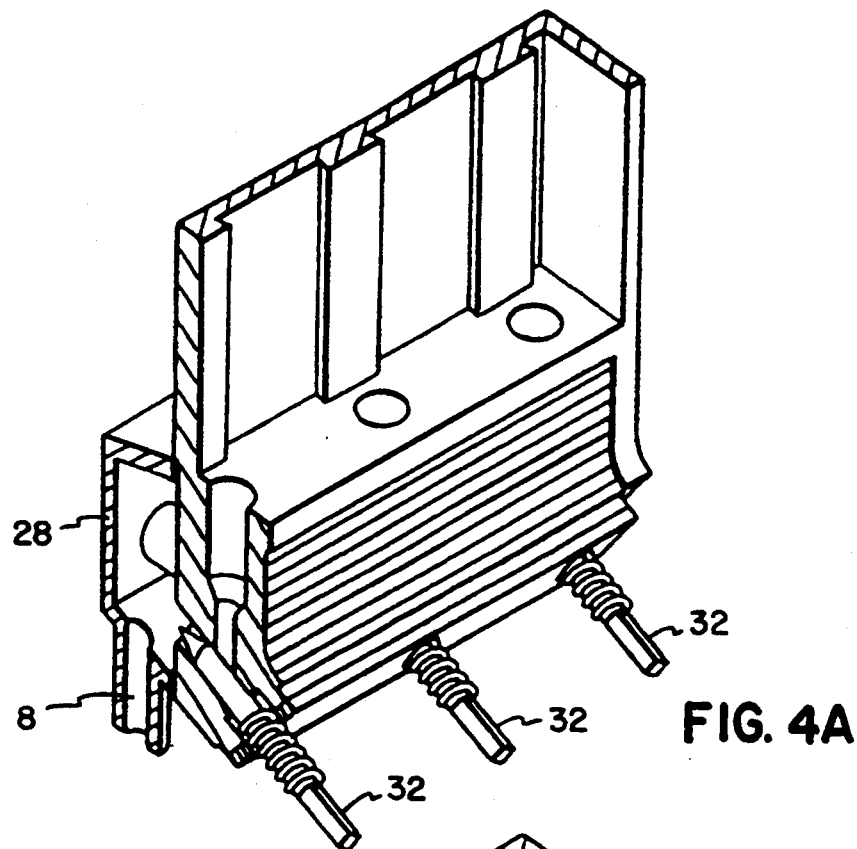
FIGS. 4A and 4B are partial sectional views of the airflow indicator.
Figure 4B:
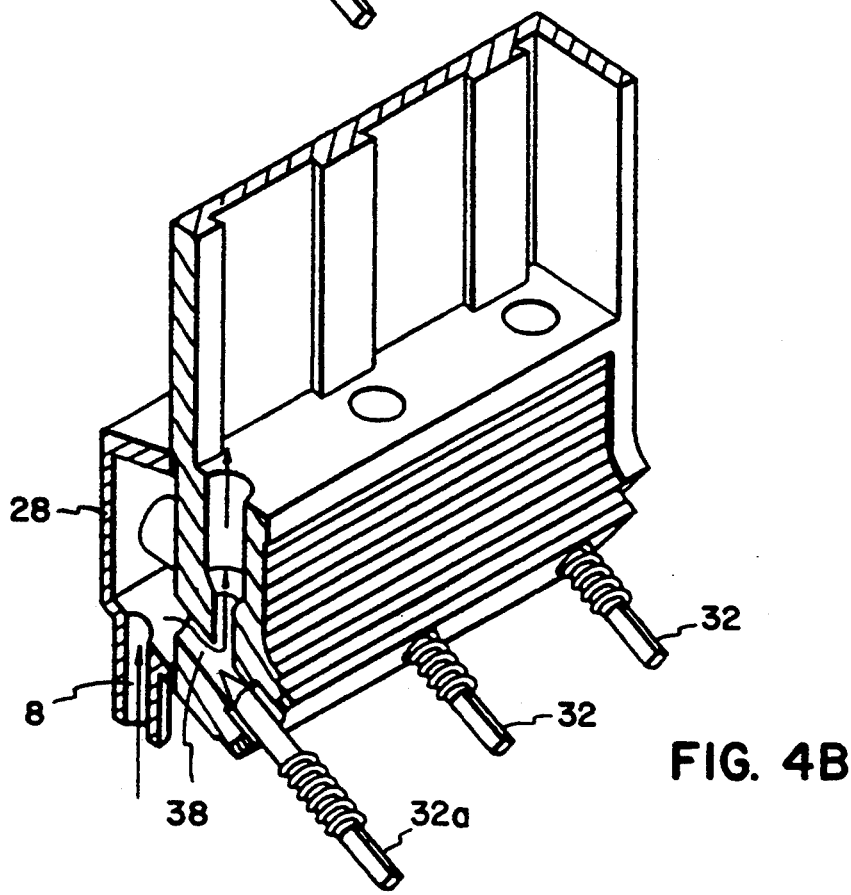

The adjustment of the rate of flow of air through each respective air passage 14 can be more fully understood by referring to FIGS. 4A and 4B. FIG. 4A shows a partial sectional view of the air inlet 8 and air chamber 28 with all the valve spindles 32 in the closed position. FIG. 4B shows the same partial sectional view with one of the valve spindles, now designated 32a, retracted from the closed position. The arrows depicted in the FIG. 4B indicate the direction of flow of air from the air inlet 8 through the air cheer 28 and valve air passage 38 and thereafter to the air passage 14 (not shown in FIG. 4A or 4B). By rotating the adjustment knobs 20, the respective valve spindle 32 is caused to move forward or backward along its longitudinal axis and thereby to adjust the rate of flow of air through valve air passage 38 and, consequently, the air passage 14, (not shown in FIG. 4).

Figure 5:
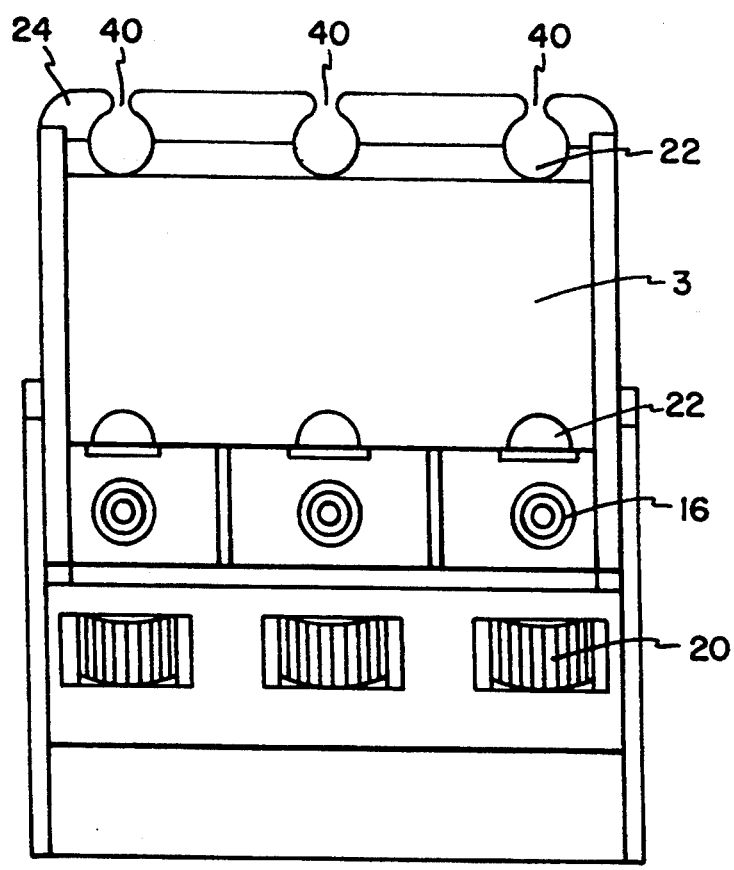
FIG. 5 is a plan view of the airflow indicator wherein the swivellable portion is in the first position.

FIG. 5 shows a plan view of the airflow indicator 1 wherein the swivellable cover 4 is in the open position. The upper arm 24 also includes a number of guide holes 40 each for receiving therethrough a respective air tube connected to a respective air outlet nozzle 16. It can be seen that by arranging each air outlet nozzle 16, the respective pair of recesses 22 on the shoulder 3 and the corresponding guide hole 40 along the same vertical plane, each air tube connected to a respective air outlet nozzle 16 is guided to turn through an angle of substantially 180° before leaving the airflow indicator 1.

It should be understood that the above only describes an embodiment by which the present invention is realised and there are other ways to carry out the invention without departing from the general inventive concept of the present invention.

I claim:

1. An airflow control and indicator device comprising a body; said body having an air distribution chamber; at least one air inlet formed in said air distribution chamber and connectable to a pressurized air supply source; a plurality of bores formed in said body, each of said bores extending at one end thereof out of said air distribution chamber; a valve seating in each said bore; adjustable needle valve means moveable towards and away from said valve seating in each said bore for controlling the flow of air therethrough from a common source of pressurized air provided by said air distribution chamber; a respective visible display passage, one end of said passage being connected to the other end of each said bore and the other end of said passage being connected to a respective air outlet; said passages being arranged in side-by-side relationship with one another; an indicating element floatable within each respective display passage in response to flow of air through said display passage from said air distribution chamber to said air outlet thereby indicating visually the flow rate of air through each respective display passage responsive to the position of each respective said needle valve means relative to its said seating.

2. A device as claimed in claim 1, wherein said floatable indicating element is a plastic bead.

3. A device as claimed in claim 1 including a pair of engaging elements, each having a respective engaging surface opposite to the other, disposed respectively adjacent an upper portion and a lower portion of the device, and the horizontal distance between said engaging surfaces equals at least the thickness of a wall of an open-top container on which the device is to be mounted.

4. A device as claimed in claim 3 mounted by means of said engaging elements on the wall of an open-top aquarium.

5. A device as claimed in claim 3, wherein said air distribution chamber forms a first engaging element having a rearwardly-facing engaging surface; an L-shaped bracket extending rearwardly from the upper portion of said body forming a second engaging element, said L-shaped bracket comprising a horizontal flange having a surface for resting on the upper edge of a container upon which the device may be mounted and a downwardly-disposed vertical flange having a forwardly-facing engaging surface.

6. A device as claimed in claim 1, further including a swivelable cover portion movable between a first position in which said air outlets are exposed to the outside of the device and a second position in which said air outlets are not exposed to the outside of said device.

7. A device as claimed in claim 6, further including guiding means for guiding an air tube connected with each respective said air outlet to turn through an angle of substantially 180° before exiting the device.

8. A device as claimed in claim 1 including rotary control means in threaded engagement with each respective needle valve means, said control means being restrained against axial movement upon rotation thereof, each respective needle valve means is moved axially towards or away from its said valve seating.

9. A device as claimed in claim 1, wherein said air distribution chamber is mounted to the backside of said body.

* * * * *

UNITED STATES PATENT AND TRADEMARK OFFICE
CERTIFICATE OF CORRECTION

PATENT NO. : 5,450,759

DATED : September 19, 1995

INVENTOR(S) : Ng

It is certified that error appears in the above-identified patent and that said Letters Patent is hereby corrected as shown below: On the title page: Item

[76], Inventor "Hong Kong" should read --Chai Wan--

[30], Foreign Application Priority Data "9405155" should read --9405155.4 --.

Signed and Sealed this

Seventh Day of January, 1997

Attest:

BRUCE LEHMAN

*Attesting Officer*     *Commissioner of Patents and Trademarks*